Jan. 19, 1954        B. CARNIOL        2,666,851
FREQUENCY GENERATOR WITH PHASE SHIFTER
Filed Feb. 3, 1948                3 Sheets-Sheet 1

Inventor:
BOHDAN CARNIOL

By (signature)
Attorney

Jan. 19, 1954  B. CARNIOL  2,666,851
FREQUENCY GENERATOR WITH PHASE SHIFTER
Filed Feb. 3, 1948  3 Sheets-Sheet 2

Inventor:
BOHDAN CARNIOL
By Attorney

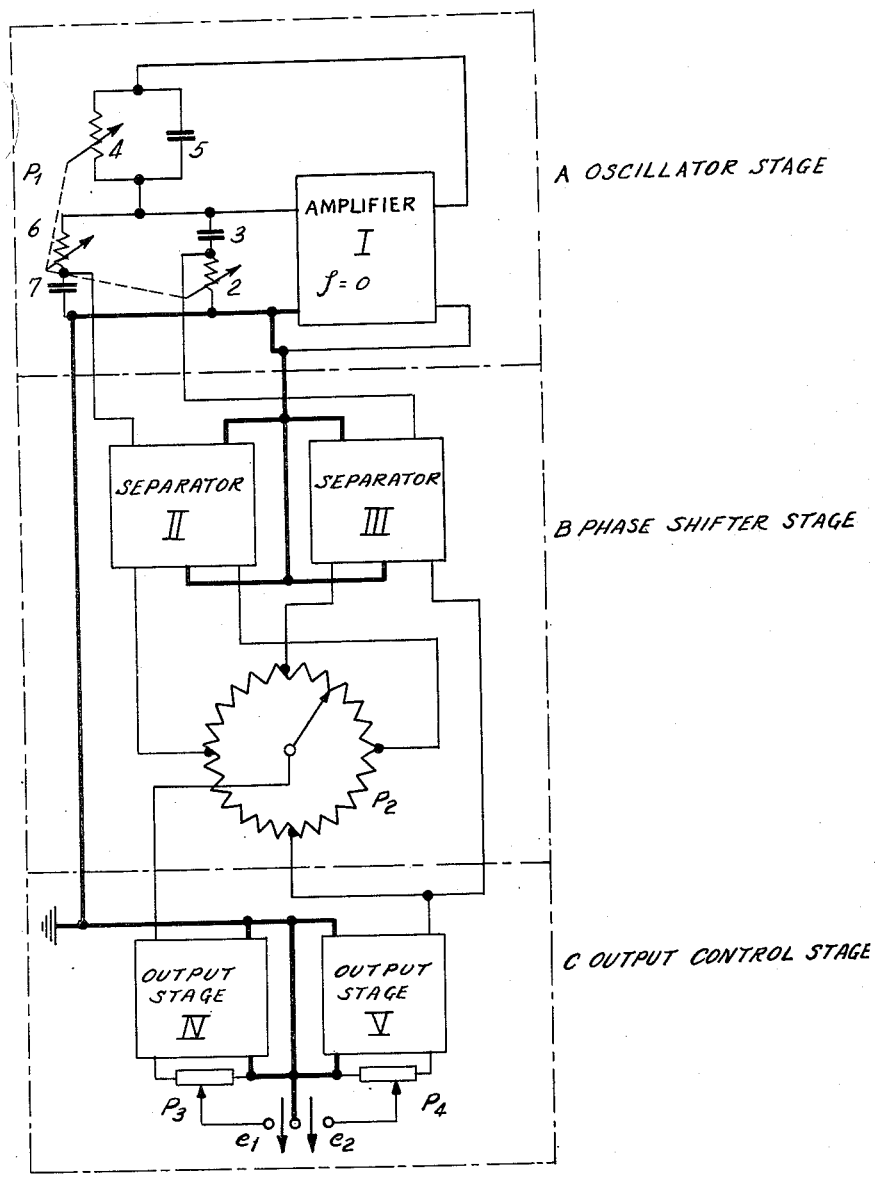

Patented Jan. 19, 1954

2,666,851

UNITED STATES PATENT OFFICE 2,666,851

FREQUENCY GENERATOR WITH PHASE SHIFTER

Bohdan Carniol, Prague, Czechoslovakia, assignor to Tesla slaboproude a radiotechnicke zavody, narodni podnik, Prague, Czechoslovakia Application February 3, 1948, Serial No. 5,973
In Czechoslovakia November 11, 1946

Section 1, Public Law 690, August 8, 1946
Patent expires November 11, 1966

18 Claims. (Cl. 250—36)

This invention relates to comparison or compensation measurements of A. C. quantities and, more particularly, to an A. C. generator capable of producing a pair of voltages having a constant phase difference and a constant amplitude relationship irrespective of frequency.

Heretofore compensation methods have been used mainly for measuring direct voltages and currents. The use of compensation methods for measuring alternating voltages and currents is far less common than their use for measuring direct voltages and currents, due to the fact that compensation measurements in the alternating current field are considerably more difficult than in connection with direct currents. In the case of direct currents it is sufficient to effect amplitude compensation, while for alternating currents both amplitude compensation and phase compensation are necessary. In many cases it is required to effect measurements at different frequencies whereby there arises a further difficulty and another condition to be complied with. Thus for compensation measurements in the field of alternating currents, alternating voltage not only of variable amplitude but also of variable phase and frequency is required.

In connection with the construction of generators and oscillators for alternating current compensators, three types of devices will be specifically referred to hereinafter:

(1) The so-called Franke-apparatus has two co-axial single phase generators of which one is provided with a movable stator to obtain two voltages with mutually measurable phase difference. The frequency may be varied by changing the angular velocity. This apparatus is used at present to a very limited extent due to its large size and to the impossibility of effecting measurements at high frequencies owing to the limited angular velocity.

(2) The low frequency oscillator whose output voltage is supplied to two output amplifiers, being led directly to one of the amplifiers and through a phase changer to the other. Then the desired frequency may be adjusted on the low frequency oscillator and the desired phase difference on the phase changer. The phase changer comprises ohmic and wattless components which may be varied to adjust the phase angle. In many cases a phasing element is used having a phase difference of 90°. The desired phase angle may be easily adjusted by the aid of another phase changer, such as for instance a two-phase transformer, in which the primary is formed as the stator and the secondary as the rotor (booster), or by means of a similar device (e. g. a circular potentiometer). Since the wattless impedances of the phase changer itself or of the phase element are dependent on the frequency, it follows that the calibration of the phase changer is valid only for a single frequency.

(3) The low frequency heterodyne oscillator, in which an acoustic frequency is obtained by mixing two high frequency oscillations having a variable frequency difference, i. e. one of the high frequency oscillators has a variable frequency.

If a phase shifter is inserted in the constant frequency side of a high frequency oscillator, the phase of the resultant acoustic frequency is influenced without regard to the value of the frequency. Therefore the calibration of the phase shifter is valid for any desired low frequency. This arrangement eliminates the disadvantages appurtenant to compensators having phase shifters connected in the low frequency side of an oscillator. However, a new disadvantage arises due to the complexity of the apparatus and its limited frequency stability, particularly at the lowest frequencies. The low frequency of a heterodyne oscillator varies by the same value as in high frequency oscillators. Consequently, its relative frequency stability decreases, with a decrease in frequency, below that of high frequency oscillators. As this frequency difference amounts to the fourth or even higher order, the frequency stability is often insufficient.

The present invention eliminates the frequency instability and complexity of the foregoing arrangement by employing a low frequency oscillator without tuned circuits, and having resistances and capacities in the feed back circuit. This method is well known and accordingly a more detailed explanation of the same does not deem to be necessary. But the present invention also eliminates the frequency varying effect of the phase shifter (phasing element) so that the calibration of the phase shifter will be valid for the whole extent of the frequency spectrum.

In accordance with the present invention, an oscillation generator is provided by an amplifier having its feed back coupling formed by a combination of frequency dependent impedances. This combination of frequency dependent impedances is selected to have such values that, throughout the frequency range it is possible to obtain two voltages having a constant amplitude ratio and a constant phase shift of 90°. The voltages are utilised in a manner known per se to secure a continuous variation of phase by means, for instance, of so-called phasing transformers (boosters), circular potentiometers, or in any other way.

The units used for the feed back of the amplifier consist of two elements connected in series. One element comprises a capacity and a resistance connected in parallel, and the other comprises a capacity and a resistance connected in series.

It is accordingly an object of the present invention to provide an oscillation generator of the R-C type having a variable frequency and producing two A. C. voltages having a constant phase difference and a constant amplitude relationship, irrespective of frequency, a common point of the two voltages being grounded.

Another object is the utilization of two sources of A. C. voltage of variable phase and constant magnitude for compensation or comparison measurements of A. C. quantities over a wide range of frequencies.

A further object is to provide an R-C oscillation generator designed to produce two output voltages constantly in quadrature irrespective of frequency and having a constant amplitude relationship equal to unity.

These, and other objects, advantages and novel features of the invention will be apparent from the following description and the accompanying drawings.

In the drawings:

Fig. 7 is a block diagram illustrating the invention oscillator as incorporated in a comparison or compensation measuring arrangement for A. C. quantities.

Figure 1:
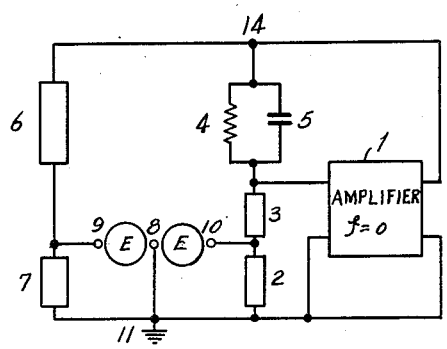
Figs. 1 and 2 are block diagrams illustrating the principles of the R-C oscillator of the invention.
Figure 2:
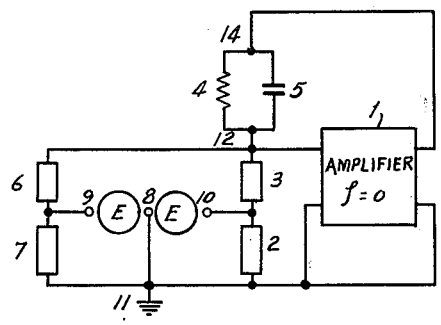

The circuit arrangements shown in Figs. 1 and 2 will be first described. In all figures of the drawings an oscillator amplifier is denoted 1. The feed back circuit of the latter is formed by impedance elements 2, 3, 4, 5. In accordance with the present invention the unit comprising elements 2, 3 is connected in series with the unit comprising elements 4, 5 and this series connection of the two units as a whole is connected to the output circuit of the amplifier 1, while the unit 2, 3 which comprises a resistance and a capacity in series, is connected to the input circuit of the amplifier 1. If the element 2 is a resistance, the element 3 will be a capacity, while if the element 2 is a capacity, the element 3 will be a resistance. The element 2 of this unit is always connected by means of one of its feed conductors to the ground connection 11 of the amplifier. In order that two alternating voltages having a constant amplitude ratio and shifted by 90° relative to each other independent of the frequency may be obtained from the oscillator and supplied to a phase shifter, the unit 2, 3, 4, 5, that is the output circuit of the amplifier 1, is connected in parallel (Fig. 1), with a unit 6, 7 comprising impedance elements such as resistances and capacities in different combinations which are shown by way of example in Figs. 3, 4 and 5. The element 7, which is either a capacity or a resistance, is connected by means of one of its feed conductors to the ground connection 11 of the amplifier 1. If the element 2 is a resistance, the element 7 will be a capacity and vice versa. The connection is made in such a way that voltages $e_{8,10}$ and $e_{8,9}$, respectively, are impressed on the elements 2 and 7, which voltages are shifted by 90° relative to each other and may be derived from the terminals 10 and 8 and the terminals 9 and 8, respectively.

In accordance with the invention, voltage in 90° phase relation may also be obtained by connecting in parallel to the amplifier input (Fig. 2) a unit 6, 7 consisting of impedance elements such as resistances and capacities so arranged that the element 7, which is either a resistance or a capacity, is connected by means of one of its feed conductors with the capacity or resistance 6, and by means of its second feed conductor to the ground connection 11 of the amplifier 1. In this way two voltages which may be used for the phase shifter and are shifted by 90° relative to each other are again obtained between the points 8, 9 and 10.

Figure 3:
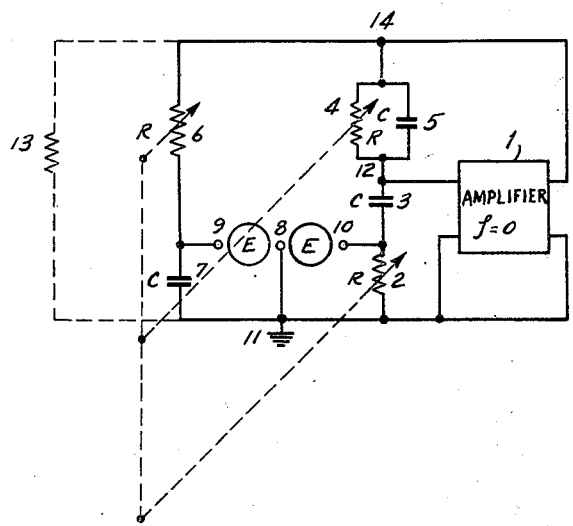
Figs. 3 through 6 are schematic wiring diagrams of various embodiments which the invention may assume in practice.

Fig. 3 shows a typical circuit arrangement corresponding to the block diagram of Fig. 1. In this example, the element 6 of the unit 6, 7 connected in parallel to the amplifier output consists of a variable ohmic resistance R and the element 7 consists of a capacity. The element 2 consists of a variable ohm resistance and the element 3 of a capacity. The resistances 2, 4, 6 have the same value R, and the capacities 3, 5, 7 have the same value C, as well. With the use of this circuit arrangement, it will be demonstrated by calculation that the phase difference between the voltages $e_{8,10}$ and $e_{8,9}$ actually is 90° or $$\frac{\pi}{2}$$

without being a function of the frequency; and that the amplitude ratio has a constant value. If the connection shown in Fig. 3 is made, the arrangement begins to produce oscillations at a frequency $$\omega = \frac{1}{RC}$$

provided the amplification factor $k$ of the amplifier 1 is greater than 1.5. Indeed, the necessary amplification factor $k$ is determined by the ratio of the voltage $e_{8,14}$ between points 8 to 14 to the voltage $e_{8,12}$ between the points 8 and 12. The ratio of the said voltages is equal to the ratio of the complex resistances on which the said voltages arise. Therefore $$K = \frac{e_{8,14}}{e_{8,12}} = \frac{R + \frac{1}{j\omega C} \pm \frac{R}{1+j\omega CR}}{R + \frac{1}{j\omega C}} \quad (I)$$

and this ratio is equal to 1.5 for $$\omega = \frac{1}{RC}$$

In order to determine the phase difference between the voltages $e_{8,9}$ and $e_{8,10}$ we shall calculate first the phase difference of the said two voltages with respect to the total voltages $e_{8,14}$. The ratio $$\frac{e_{8,9}}{e_{8,14}}$$

is again equal to the ratio of the complex resistances on which these voltages arise, or for $$\omega = \frac{1}{RC}$$

$$\frac{e_{8,9}}{e_{8,14}} = \frac{\frac{1}{j\omega C}}{R + \frac{1}{j\omega C}} = \frac{e^{-j\frac{\pi}{2}}}{\sqrt{2} \cdot e^{-j\frac{\pi}{4}}} = \frac{1}{\sqrt{2}} e^{-j\frac{\pi}{4}} \quad (II)$$

The ratio $$\frac{e_{8,10}}{e_{8,14}}$$

for $$\omega = \frac{1}{RC}$$

is given by the equation $$\frac{e_{8,10}}{e_{8,14}} = \frac{R}{R + \frac{1}{j\omega C} + \frac{R}{1+j\omega CR}} = \frac{\sqrt{2}}{3} e^{+j\frac{\pi}{2}} \quad \text{(III)}$$

The equations II and III show that the voltages $e_{8,9}$ and $e_{8,10}$ are shifted relative to each other by $$\frac{\pi}{2}$$

or 90°. This appears also from the equation for the ratio of these voltages or for the ratio of the Equations III and II.

$$\frac{e_{8,10}}{e_{8,9}} = \frac{\frac{\sqrt{2}}{3} \cdot e^{+j\frac{\pi}{4}}}{\frac{1}{\sqrt{2}} \cdot e^{-j\frac{\pi}{4}}} = \frac{2}{3} e^{j\frac{\pi}{2}} \quad \text{(IV)}$$

This expression confirms the above affirmation regarding the phase relation and shows moreover that the voltages $e_{8,10}$ and $e_{8,9}$ are in the ratio of 2 to 3. In accordance with the invention, the amplitude compensation may be effected by connecting the member 6, 7 to the resistance 13 ($R_1$) in the manner of a potentiometer.

By the same process of computing it may be proved that the circuit arrangement shown in Fig. 3 is equivalent to a circuit arrangement in which the element 2 is a capacity having the value C, the element 3 a resistance having the value R, the element 7 a resistance having the value R and the element 6 a capacity having the value C.

The frequency of the generator in the circuit arrangements shown in Fig. 3 may be varied either by simultaneous adjustment of the resistances R, as is shown in the drawing, or by simultaneous adjustment of the capacities. The variation may be either a continuous one, by providing for ganged potentiometers or condensers, or may be effected in steps by the use of a tapped switch. If it is desired to effect the adjustment while avoiding variation of the total impedance and consequently of the load on the amplifier when a change in frequency takes place, a small resistance 13 ($R_1$) is connected in parallel to the amplifier output. This resistance preferably is smaller than the resultant impedance of the units (2, 3, 4, 5) and (6, 7) consisting of resistances and capacities. In this way undesirable phase shift of the amplifier itself is avoided. If the frequency variation is effected by varying the capacities C of the condensers, the impedance of the whole arrangements is invariable as a function of the frequency.

Figure 4:
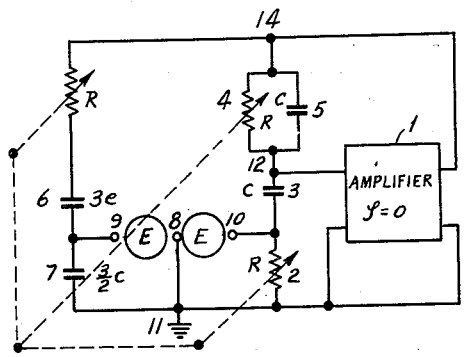

Fig. 4 shows a further circuit arrangement corresponding to the block diagram of Fig. 1. In this example the elements of unit 6, 7 are so chosen, that the element 7 is a capacity having a value ⅔C and the element 6 is a capacity which has a value 3C and is connected in series with a resistance having the value R. The element 2 is a resistance having the value R. With these values and the arrangement shown, the two voltages $e_{8,9}$ and $e_{8,10}$ have the same amplitude.

Figure 5:
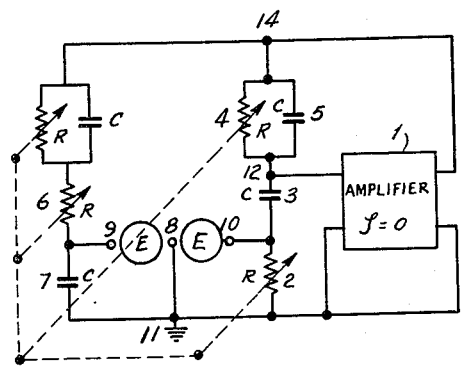

Fig. 5 shows a special circuit corresponding to the block diagram of Fig. 1, wherein, in parallel with the amplifier output, there are connected four branches of a bridge which differ from each other only in that in the units, each of which comprises a capacity connected in series with a resistance, the sequence of the elements is reversed.

Accordingly the element 7 is a capacity having the value C and the element 2 is a resistance having the value R. In view of the equivalency of the two circuit arrangements it is possible, of course, to use for the element 7 a resistance of the value R and for the element 2 a capacity of the value C. The total impedance between the points 8—14 is then resistive over the entire frequency range and the resistance $R_1$ (13) becomes superfluous.

Figure 6:
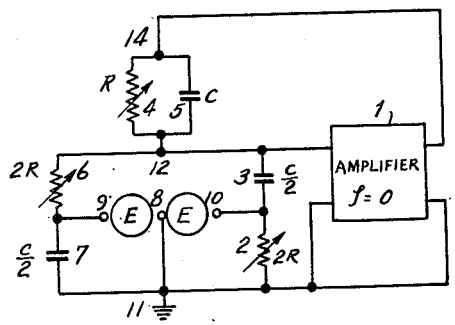

Fig. 6 shows one circuit arrangement corresponding to the block diagram of Fig. 2. The unit 6, 7 is formed by two elements, a resistance and a capacity, the resistance 6 having a value 2R and the capacity a value $$\frac{C}{2}$$

The unit 2, 3 comprises a resistance 2 of a value 2R and a capacity of a value $$\frac{C}{2}$$

The purpose of the arrangement is to obtain two voltages shifted in phase by 90° and at the same time to provide a unit which comprises the elements 2, 3 and 6, 7, and whose total resistance and capacity are equal to the resistance R and capacity C connected-up in series in the resistance-capacity unit. In all circuit arrangements shown in Figs. 4, 5 and 6 it is possible to prove by calculation that the voltages are actually phase shifted by 90°, in the same manner as demonstrated for the arrangement shown in Fig. 3, and that the value of the voltage $e_{8,9}$ is equal to the value of the voltage $e_{8,10}$ for any desired frequency.

Fig. 7 shows an example of the complete low frequency compensator. The block A comprises a low frequency R-C oscillator which, in accordance with the present invention, produces at 8—9 and 8—10 two equal voltages having a phase shift of 90°, and a potentiometer for adjusting 4 and 6 simultaneously.

These voltages are fed to identical separating amplifiers II, III, which apply the voltages, at right angles to each other, to a circular potentiometer, or other suitable continuous phase adjusting device $P_2$. Block C contains two power amplifiers IV, V, one for the constant direction voltage and the other for the phase adjusted voltage obtained from $P_2$. The frequency of both voltages is determined by adjustment of $P_1$ in the oscillator stage A. The magnitude of the voltages is controlled by the potentiometers $P_3$, $P_4$ in the output stage.

The arrangement of Fig. 7 thus provides a simple device, usable with an indicator of equal phase and magnitude A. C. voltages, for all types of measurement of A. C. vector quantities in the frequency range of the novel R-C oscillator A.

It will be understood that the feedback circuit of the oscillator, which supplies the two quadrature voltages of constant phase difference independent of frequency, may employ impedance arrangements other than those specifically described. For example, combinations of capacitances and inductances, of resistances and inductances, or of capacitances, resistances and inductances may be used. In practice, however, such combinations are not as desirable as those specifically exemplified due to instability of inductance values and the expense of high quality inductances.

Also, the anode output terminal of the amplifier may be grounded, with the cathode and input terminals having a definite potential relative to the ground. The relative connections of the feedback and parallel circuits are reversed, to bring the series connected elements nearer to ground potential. In such case, the parallel connected feedback resistance can serve as a grid leak.

In the block B is arranged a circular potentiometer which is fed in two directions at right angles to each other with two voltages from the generator over respective amplifiers. Beyond the block C two voltages may be branched off, whose frequency may be controlled by a triple potentiometer $P_1$, the phase difference may be adjusted by a potentiometer $P_2$ and the value may be adjusted by means of the potentiometers $P_3$ and $P_4$.

The present invention is not restricted to the circuit arrangements shown by way of example in the accompanying drawings. The invention relates in fact broadly to all circuit arrangements capable of supplying two alternating voltages of constant amplitude ratio and shifted in phase by 90° with respect to each other, without being a function of frequency. To secure a continuous variation of the phase, use may be made of any of the known phase shifters employing two voltages of the same amplitude and a phase difference of 90°.

While specific embodiments of the invention have been shown and described in detail to illustrate the application of the principles thereto, it should be understood that the invention may be otherwise embodied without departing from such principles.

What I claim as my invention is:

1. In an oscillator circuit, an amplifier having a pair of input terminals and a pair of output terminals and zero phase shift, a common grounded connection for one input and one output terminal; a voltage dividing feedback network connected between the output and the input of said amplifier and comprising interconnected resistances and reactances; said network including a first section connected between the other output terminal and the other input terminal and comprising a resistance and a reactance in parallel circuit relation, and a second section connected between such other input terminal and said common connection and comprising a resistance and a reactance in series circuit relation; a second voltage divider connected between said common connection and a point on said network and comprising interconnected resistances and reactances; means for applying a first alternating voltage between a point on said network and said common connection; and means for applying a second alternating voltage between a point on said second voltage divider and said common connection; said voltages having the same frequency, a constantly equal amplitude, and a quadrature phase relation.

2. An amplifier as claimed in claim 1 in which said second voltage divider is connected in parallel with the whole of said network.

3. An amplifier as claimed in claim 1 in which said second voltage divider is connected in parallel with the second section of said network.

4. An amplifier as claimed in claim 1 including means operable to simultaneously vary the values of all the resistances of said network and second voltage divider.

5. An amplifier as claimed in claim 1 in which said reactances comprise condensers, said second voltage divider is connected in parallel with the whole of said network, the relation of the series connected resistance and condenser of said second network section relative to said common connection being the reverse of that of the series connected resistance and condenser of said second divider, said points on said network and second voltage divider being the junction of the series connected resistance and condenser, all of said resistances are equal in value and all of said reactances are equal in value.

6. An amplifier as claimed in claim 1 in which said reactances comprise condensers, said second voltage divider is connected in parallel with the whole of said network, the relation of the series connected resistance and condenser of said second network section relative to said common connection being the reverse of that of the series connected resistance and condenser of said second divider, the reactance of said second divider comprising two series connected condensers having a magnitude ratio of 1:2 with the smaller condenser being nearer said common connection, said points on said network being the junction of the series connected resistance and condenser, said point on said second divider being the junction of the two condensers thereof, all of said resistances are equal in value, and the total capacities of each combination being equal in value.

7. An amplifier as claimed in claim 1 in which said reactances comprise condensers, the second voltage divider comprises a parallel connected resistance and reactance combination and a series connected resistance and reactance combination in series with the parallel connected combination, said second voltage divider is connected in parallel with the whole of said network, the relation of the series connected resistance and condenser of said second network section relative to said common connection being the reverse of that of the series connected resistance and condenser of said second divider, said points on said network being the junction of the series connected resistance and condenser, said point on said second divider being the junction of the resistance and reactance of the series connected combination, all of said resistances are equal in value, and all of said reactances are equal in value.

8. An amplifier as claimed in claim 1 in which said reactances comprise condensers, said second voltage divider is connected in parallel with the second section of said network, the relation of the series connected resistance and condenser of said second network section relative to said common connection being the reverse of that of the series connected resistance and condenser of said second divider, said points on said network and second voltage divider being the junction of the series connected resistance and condenser, and the values of the resistances and reactances of the second network section and the second voltage divider are one-half the value of the corresponding components of the first network section.

9. In an oscillator circuit an amplifier having a pair of input terminals and a pair of output terminals; a common connection for one input terminal and one output terminal; and a feedback network connected to the amplifier and including, a resistance-capacitance bridge comprising alternately arranged resistance and capacitance arms, the opposite resistance arms of said bridge being equal in value, a junction of said bridge being connected directly to said common connection and the opposite junction of said bridge being connected directly to the other amplifier input terminal, and a parallel connected resistance-capacitance combination having one terminal connected to such opposite bridge junction and the other terminal connected to the other amplifier output terminal; and means for deriving a pair of constantly equal amplitude quadrature related voltages respectively between each of the other two junctions of said bridge and said common connection.

10. An oscillator circuit as claimed in claim 9 in which all said resistances have the same value.

11. An oscillator circuit as claimed in claim 9 in which all said capacitances have the same value.

12. An oscillator circuit as claimed in claim 9 in which all said resistances have the same value and all said capacitances have the same value.

13. An oscillator circuit as claimed in claim 9 in which the bridge resistances have twice the value of the combination resistance and the bridge capacitances have one-half the value of the compensation capacitance.

14. In an oscillator circuit, an amplifier having a pair of input terminals and a pair of output terminals; a common connection for one input terminal and one output terminal; and a feedback network connected to said amplifier and including a resistance-capacitance bridge comprising alternately arranged resistance and capacitance arms, the opposite resistance arms of said bridge being equal in value, a junction of said bridge being connected directly to said common connection and the opposite junction of said bridge being connected to the other amplifier input terminal, and a parallel connected resistance-capacitance combination; a connection between one terminal of said combination and the other amplifier output terminal; a connection between the other terminal of said combination and the other amplifier input terminal; and means for deriving a pair of constantly equal amplitude quadrature related voltages respectively between each of the other two junctions of said bridge and said common connection.

15. In an oscillator circuit, an amplifier having a pair of input terminals and a pair of output terminals; a common connection for one input terminal and one output terminal; and a feedback network connected to said amplifier and including a resistance-capacitance bridge comprising alternately arranged resistance and capacitance arms, the opposite resistance arms of said bridge being equal in value, a junction of said bridge being connected directly to said common connection and the opposite junction of said bridge being connected to the other amplifier input terminal and a parallel connected resistance-capacitance combination; a connection between one terminal of said combination and the other amplifier output terminal; a connection between the other terminal of said combination and the other amplifier input terminal; means for deriving a pair of constantly equal amplitude quadrature related voltages respectively between each of the other two junctions of said bridge and said common connection; and an additional capacitance in series with a resistance arm of said bridge; said resistances all having the same value, the additional capacity having three times the value of the combination capacity, the capacity in the adjacent bridge arm having 1.5 times the value of the combination capacity, and the other bridge capacity being equal in value to the combination capacity.

16. In an oscillator circuit, an amplifier having a pair of input terminals and a pair of output terminals; a common connection for one input terminal and one output terminal; and a feedback network connected to said amplifier and including a resistance-capacitance bridge comprising alternately arranged resistance and capacitance arms, the opposite resistance arms of said bridge being equal in value, a junction of said bridge being connected directly to said common connection and the opposite junction of said bridge being connected to the other amplifier input terminal, and a parallel connected resistance-capacitance combination; a connection between one terminal of said combination and the other amplifier output terminal; a connection between the other terminal of said combination and the other amplifier input terminal; means for deriving a pair of constantly equal amplitude quadrature related voltages respectively between each of the other two junctions of said bridge and said common connection; and a second parallel connected resistance-capacity combination, equal in R and C values to the first combination, connected in series with another arm of said bridge.

17. In an oscillator circuit, an amplifier having a pair of input terminals and a pair of output terminals; a common connection for one input terminal and one output terminal; and a feedback network connected to said amplifier and including a resistance-capacitance bridge comprising alternately arranged resistance and capacitance arms, the opposite resistance arms of said bridge being equal in value, a junction of said bridge being connected directly to said common connection and the opposite junction of said bridge being connected to the other amplifier input terminal, and a parallel connected resistance-capacitance combination; a connection between one terminal of said combination and the other amplifier output terminal; a connection between the other terminal of said combination and the other amplifier input terminal; means for deriving a pair of constantly equal amplitude quadrature related voltages respectively between each of the other two junctions of said bridge and said common connection; and a second parallel connected resistance-capacity combination, equal in R and C value to the first combination, connected in series with a resistance arm of said bridge.

18. In an oscillator circuit, an amplifier having a pair of input terminals and a pair of output terminals; a common connection for one input terminal and one output terminal; and a feedback network connected to said amplifier and including a resistance-capacitance bridge comprising alternately arranged resistance and capacitance arms, the opposite resistance arms of said bridge being equal in value, a junction of said bridge being connected directly to said common connection and the opposite junction of said bridge being connected to the other amplifier input terminal, and a parallel connected resistance-capacitance combination; a connection between one terminal of said combination and the other amplifier output terminal; a connection between the other terminal of said combination and the other amplifier input terminal; and means for deriving a pair of constantly equal amplitude quadrature related voltages respectively between each of the other two junctions of said bridge and said common connection; all of said resistances being variable and gauged for simultaneous variation.

BOHDAN CARNIOL.

References Cited in the file of this patent

UNITED STATES PATENTS

| Number | Name | Date |
|---|---|---|
| 2,030,113 | Lyle | Feb. 11, 1936 |
| 2,135,051 | Plebanski | Nov. 1, 1938 |
| 2,147,723 | Wintringham | Feb. 21, 1939 |
| 2,268,872 | Hewlett | Jan. 6, 1942 |
| 2,439,245 | Dunn | Apr. 6, 1948 |
| 2,446,821 | Gassel et al. | Aug. 10, 1948 |
| 2,451,858 | Mork | Oct. 19, 1948 |
| 2,516,906 | Osterlund et al. | Aug. 1, 1950 |